US010181332B1

United States Patent
Laag et al.

(10) Patent No.: US 10,181,332 B1
(45) Date of Patent: Jan. 15, 2019

(54) SYSTEM AND METHOD FOR DETECTING AND IDENTIFYING UNMANNED AIRCRAFT SYSTEMS

(71) Applicant: THE AEROSPACE CORPORATION, El Segundo, CA (US)

(72) Inventors: Edward Aric Laag, Leesburg, VA (US); Kiley Lauren Yeakel, Middleburg, VA (US); Eric Bernard Wendoloski, Burke, VA (US); Jason Laurence Tichy, Winchester, VA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 15/927,609

(22) Filed: Mar. 21, 2018

(51) Int. Cl.
*H04R 29/00* (2006.01)
*G10L 25/51* (2013.01)
*G10L 25/27* (2013.01)
*B64C 39/02* (2006.01)

(52) U.S. Cl.
CPC .............. *G10L 25/51* (2013.01); *G10L 25/27* (2013.01); *B64C 39/024* (2013.01)

(58) Field of Classification Search
CPC ........ H04R 29/00; H04R 29/004; H04R 3/00; H04R 3/04; G10L 25/27; G10L 25/51; G10L 25/60; G10L 19/00; G10H 3/14; B64C 39/024; B64C 39/003; B64C 39/028; B64C 2201/00; B64C 2201/02
See application file for complete search history.

(56) References Cited

U.S. PATENT DOCUMENTS

| 9,693,139 | B1 * | 6/2017 | Teknos | G10K 11/178 |
| 2005/0027766 | A1 * | 2/2005 | Ben | G10L 25/48 708/300 |
| 2007/0100606 | A1 * | 5/2007 | Rogers | G10L 19/26 704/205 |
| 2015/0055788 | A1 * | 2/2015 | Zakis | H04R 3/002 381/71.1 |
| 2015/0302858 | A1 * | 10/2015 | Hearing | G10L 19/00 381/58 |
| 2016/0355125 | A1 * | 12/2016 | Herbert | B60K 35/00 |
| 2017/0148467 | A1 * | 5/2017 | Franklin | G10L 25/51 |

* cited by examiner

*Primary Examiner* — Thang V Tran
(74) *Attorney, Agent, or Firm* — Eversheds Sutherland

(57) ABSTRACT

Systems, methods, and apparatuses are presented herein for detecting and identifying unmanned aircraft systems (UAS) or drones. The system can include one or more UAS sensor nodes distributed about an area to be monitored. Each UAS sensor node can be communicably coupled to a central server but is able to conduct detection and identification procedures separate from the central server. The UAS sensor node can include a microphone that detects an audio signal generated within the area to be monitored. The node can convert the audio signal into a digital signal, can segment the audio signal, and can pass the signal through a bandpass filter. The node can also conduct a Fourier transform and smooth filtering on the digital audio signal before comparing the signal to multiple stored sample UAS audio signals for known UAS vehicles and motor stresses to determine a likelihood of a match.

20 Claims, 9 Drawing Sheets

| Audio File | UAS Brand | UAS Model | UAS ID | Motor Strain Level |
|---|---|---|---|---|
| 1 | Brand 1 | Model A | Tail ID #1 | Low |
| 2 | Brand 1 | Model A | Tail ID #1 | Medium |
| 3 | Brand 1 | Model A | Tail ID #1 | High |
| 4 | Brand 1 | Model A | Tail ID #2 | Low |
| 5 | Brand 1 | Model A | Tail ID #2 | Medium |
| 6 | Brand 1 | Model A | Tail ID #2 | High |
| 7 | Brand 1 | Model B | Tail ID #1 | Low |
| 8 | Brand 1 | Model B | Tail ID #1 | Medium |
| 9 | Brand 1 | Model B | Tail ID #1 | High |
| 10 | Brand 2 | Model A | - | Low |
| 11 | Brand 2 | Model A | - | Medium |
| 12 | Brand 2 | Model B | - | High |
| 13 | Brand 2 | Model B | - | Low |
| 14 | Brand 2 | Model B | - | Medium |
| 15 | Brand 2 | Model B | - | High |
| 16 | Brand 3 | Model B | Tail ID #1 | Low |
| 17 | Brand 3 | Model B | Tail ID #1 | Medium |
| 18 | Brand 3 | Model B | Tail ID #1 | High |
| N | Brand X | Model Y | Tail ID #N | - |

Fig. 3

SYSTEM AND METHOD FOR DETECTING AND IDENTIFYING UNMANNED AIRCRAFT SYSTEMS

FIELD OF THE DISCLOSURE

The present disclosure is generally directed to audio monitoring and evaluation and more particularly to systems and methods for detecting and identifying unmanned aircraft systems ("UAS"), such as drone aircraft, in flight.

BACKGROUND

The vast majority of users of UAS vehicles use them for legitimate personal or commercial purposes. However, recent history has shown that a UAS can quickly be converted from a device that is beneficial for commerce and/or amusement to one that can deliver harm and destruction to a desired location. While certain laws are in place regarding the proper use of UAS vehicles, diligent legislation will not ensure nefarious actors will be completely eliminated or deterred.

Conventional drone detection systems have been designed to monitor an area for UAS vehicle activity and notify a designated person or entity if a drone is believed to be in the designated area under surveillance. However, this kind of system is limited in its ability to fully characterize the threat. For instance, certain brands and models of UAS vehicles are able to carry greater payloads than other brands and models of UAS vehicles, making them more likely to be able to deliver contraband or destructive devices into the monitored area. Further, certain brands and models of UAS vehicles may include better technological upgrades than other UAS brands and models, which make them better suited for precision delivery of contraband or destructive devices into the monitored area.

In certain situations, knowing the brand and model of the UAS vehicle may not be sufficient to properly evaluate the likelihood of intent to do harm or cause destruction. In some cases, being able to identify the specific the UAS vehicle down to the serial number or tail number for the brand and model of the UAS vehicle may provide the receiving party with additional information. This additional information may help the receiving party determine likelihood that the UAS vehicle is entering the monitored area with a negative intent.

In addition, knowing additional information about the UAS vehicle could further help the receiving party to determine the intent of the UAS vehicle. For example, being able to evaluate the level of strain on the one or more motors driving the UAS vehicle could help determine if the UAS vehicle is carrying a payload that is in addition to the weight of the UAS vehicle. More granularly, being able to evaluate the amount or weight of the payload could provide greater insight into the likely make-up of the payload and the actual potential for damage or destruction cause by the UAS vehicle or whether it is likely to be one that is not of concern.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3 is an example data structure of audio files of UAS vehicle audio samples stored according to UAS brand, model, identifier number (e.g., serial number, tail number, registration number), and motor strain level within the UAS sensor node of FIGS. 1 and 2, in accordance with one example embodiment of the disclosure.

DETAILED DESCRIPTION OF THE EXAMPLE EMBODIMENTS

Example embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that this disclosure will be thorough and complete, and will fully convey the scope of the concepts to those skilled in the art. Like numbers refer to like, but not necessarily the same or identical, elements throughout.

Certain relationships between dimensions of the UAS detection and identification system and between features of the UAS detection and identification system are described herein using the term "substantially." As used herein, the term "substantially" indicates that each of the described dimensions or linear descriptions is not a strict boundary or parameter and does not exclude functionally similar variations therefrom. Unless context or the description indicates otherwise, the use of the term "substantially" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Figure 1:
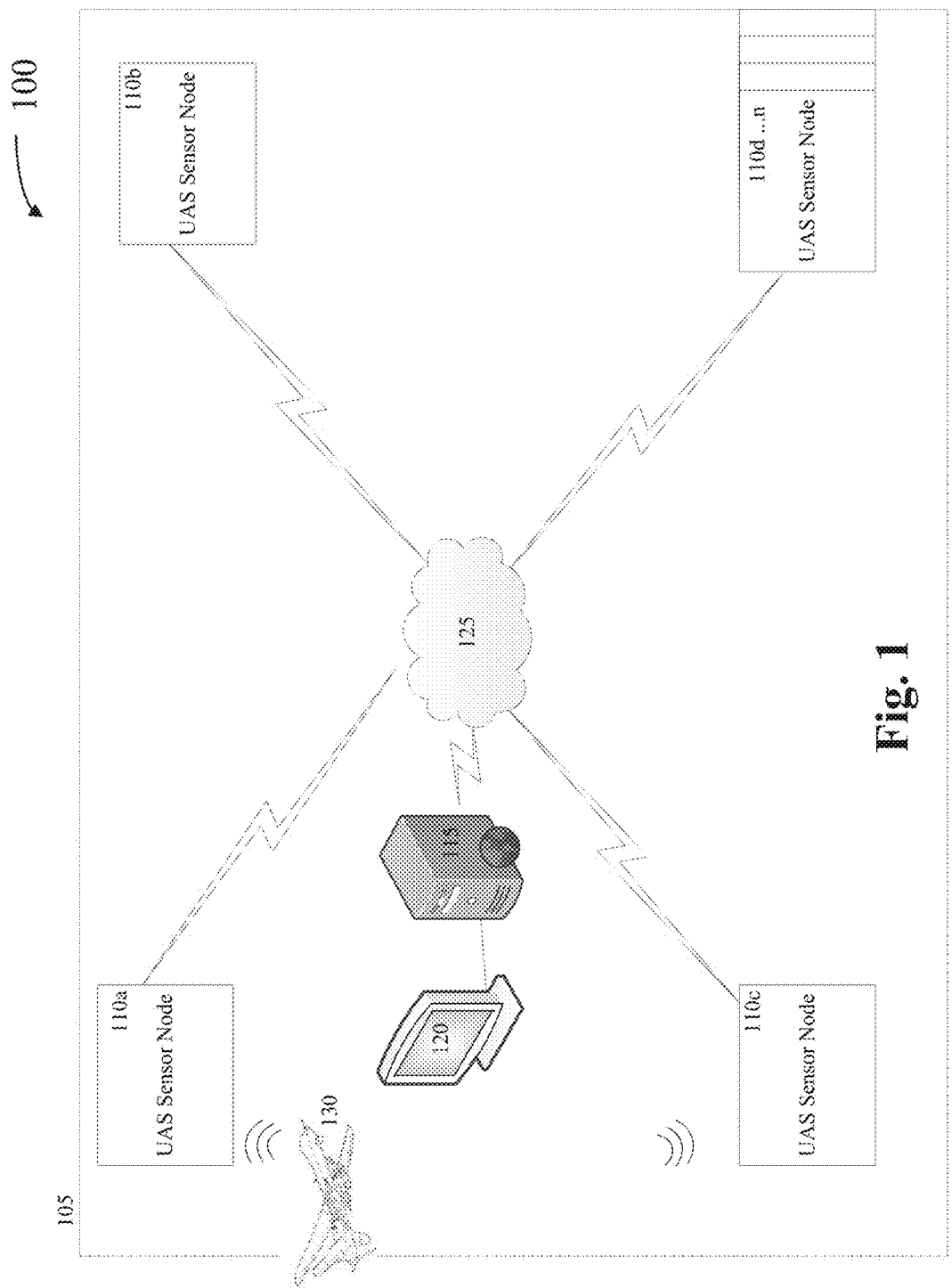
FIG. 1 is a simplified block diagram illustrating an example UAS vehicle detection environment, including a central server and one or more UAS sensor nodes communicably coupled to the central server and distributed throughout the detection environment, in accordance with example embodiments of the disclosure.

FIG. 1 is a simplified block diagram illustrating an example UAS vehicle detection environment 100, including a central server 135 and one or more UAS sensor nodes 110a-n communicably coupled to the central server 125 and distributed throughout the detection environment 100, in accordance with example embodiments of the disclosure. Referring now to FIG. 1, the UAS vehicle detection environment 100 can comprise any bounded or unbounded exterior space 105. In addition, the UAS vehicle detection environment 100 can include covered areas, tunnels, areas bounded on fewer than all sides or any other space that is accessible by a UAS vehicle 130. The exterior space 105 can be located in urban, suburban, or rural settings. Further, the exterior space 105 can be sparsely or densely populated and can include humans interacting within the space during the time of detection of a UAS vehicle 130.

Figure 4:
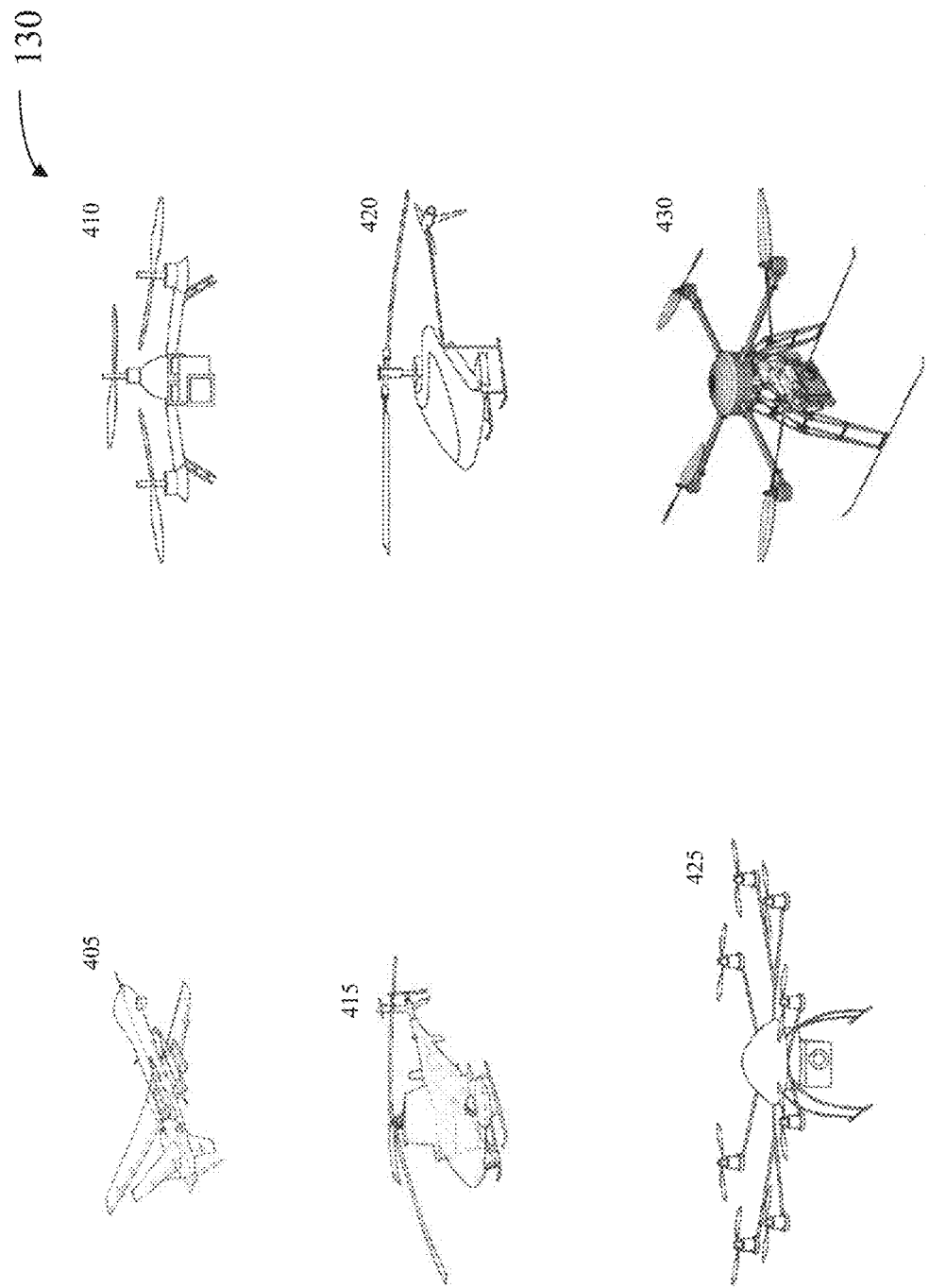
FIG. 4 is a diagram of different brands and models of UAS vehicles, in accordance with one example embodiment of the disclosure.

FIG. 4 is a diagram of different brands and models of UAS vehicles 130, in accordance with one example embodiment of the disclosure. Referring now to FIGS. 1 and 4, UAS vehicles 130 come in many different shapes and sizes. UAS vehicles 130 can also have many different types of rotors and numbers of rotors. In addition, UAS vehicles 130 can vary in the positioning of the rotors, both along the fuselage and whether vertically or horizontally oriented. Some of this variation can be attributed to the intended use of the UAS vehicle 130, while other variations are more stylistic. While FIG. 4 shows some varieties of UAS vehicles 130, the display is not intended to show all of the different types of UAS vehicles 130. For example, FIG. 4 shows a UAS vehicle 405 that is generally shaped like a conventional aircraft and includes a single main rotor along the tail of the vehicle 405. FIG. 4 also shows a UAS vehicles 415 and 420 that are generally shaped like a helicopter and include a single main rotor and a tail rotor. In addition, the UAS vehicle 410 includes three rotors with at least one rotor positioned at a different elevation. FIG. 4 also presents UAS vehicles 425, 430 having eight rotors and five rotors respectively.

For each type of UAS vehicle 130, including, but not limited to vehicles 405-430, each rotor may be coupled to a motor that is independently powered and operated on the vehicle 130. In addition, each rotor can be controlled separate and distinct from other rotors on the UAS vehicle 130. Providing UAS vehicles 130 with independently operated rotors can allow for greater maneuverability of the UAS vehicle 130. UAS vehicles 130 can range in weight from one to hundreds or thousands of pounds and have motors and rotors that can vary in size and shape. In addition, rotors for the different UAS vehicles 130 can be made of different materials, including, but not limited to, plastic, metal, metal alloys, composites, etc.).

The motors driving these UAS vehicles 130 are typically brushless DC motors. However other motor types are within the scope of this disclosure. Each of these motors driving these rotors can generate an audible noise under operation. In many instances, the noise generated is different not only between brands and models of UAS vehicles 130 but also from vehicle to vehicle within the same brand. As such, the audible noise can act like a fingerprint, individually identifying the specific UAS vehicle 130, not just the type of UAS vehicle, the brand, or the model.

Throughout this disclosure, reference is made to different types of audio signals or acoustic waves that are generated by the motor or motors on a UAS vehicle 130. The disclosed UAS sensor node 110 converts these audio signals into digital sound samples, splits up the samples into discreet sizes for comparison, processes each segment of the audio sample into a filtered and fast Fourier transformed sample, conducts an initial review pass of the sample segment to determine if the digital sample segment is from a UAS vehicle 130 generally and then does a second review pass comparing the filtered and fast Fourier transformed digital audio segment to known UAS vehicle signature audio files to determine more specific information about the UAS vehicle 130, including, but not limited to, the brand of UAS vehicle, the model of UAS vehicle, the location of the UAS vehicle when detected, the level of strain on the motor and/or an estimated weight being carried by the UAS vehicle in addition to the vehicle weight, the potential payload being carried by the UAS vehicle, and the time and location of the UAS vehicle or the UAS sensor node 110 when the detection of the UAS vehicle occurred.

In one example embodiment, the UAS vehicle signature audio files are digital audio files stored within each individual UAS sensor node 110. By placing the signature audio files in each sensor node 110, it allows for a quicker determination as to likelihood of identification of a potential UAS vehicle in the monitored area and reduces the communication and computational strain on the central server 115. In other example embodiments, the UAS vehicle signature audio files can be stored on the central server 115, which can receive the audio signal from the UAS sensor node 110 and conduct the filtering, fast Fourier transforming and analysis of the received audio signal.

In certain example embodiments, at least a portion of the UAS vehicle signature audio files are generated through testing of different brands and models of different UAS vehicles 130 and by placing those vehicles 130 under different load levels to generate different levels of strain on the motors of those vehicles 130. In addition, at least a portion of the UAS vehicle signature audio files are generated "in the field" using the system 100 disclosed herein. For example, as different UAS vehicles 130 pass through the monitored area 105 and one or more audio signals is detected and recorded by one or more UAS sensor nodes 110a-n in the monitored area 105, those fast Fourier transformed and filtered audio signals can be stored as an audio file in memory 235 (of FIG. 2) locally at the particular UAS sensor node 110 and/or centrally at the server (so that the audio file can be transmitted to other UAS sensor nodes 110). In addition to the field-sensed audio file, as much information as can be determined about the UAS vehicle (e.g., brand, model, ID, motor stress level, payload, etc.) can also be stored in the memory 235 and/or transmitted to the central server 115 for distribution to one or more other UAS sensor nodes 110.

As discussed herein, reference may be made to UAS vehicle brands. A UAS vehicle brand is made by a particular manufacturer and can include multiple different types of UAS vehicle models. As discussed herein, reference may also be made to UAS vehicle models. A UAS vehicle model is a specific UAS vehicle product manufactured by a specific entity, though it may, and typically will, make multiples of that specific product. The UAS vehicle model can include, for example, a make, a brand name, a product name, a stock keeping unit, etc. Those of ordinary skill in the art will recognize that different entities may manufacture one or many different UAS vehicle models within a UAS vehicle class.

Returning to FIG. 1, the environment 100 can include one or more UAS sensor nodes 110a-n. These UAS sensor nodes 110a-n (collectively "110") can be positioned in any form or fashion to sense sound generated in the monitored space 105. For example, the UAS sensor nodes 110 may be positioned along the perimeter of the monitored space 105. In another example, the UAS sensor nodes 110 may be positioned centrally within the monitored space 105 and aimed toward the exterior of the monitored space 105. In yet another example, the UAS sensor nodes may be clustered and/or may be positioned throughout the monitored space 105 in an array format. While the example embodiment of FIG. 1 shows four UAS sensor nodes 110a, 110b, 110c, and 110d, this is for example purposes only, as the number of UAS sensor nodes 110 can be any number and can be dependent on the size, location, topography, and other factors of the monitored space.

The example UAS sensor nodes 110 are each configured to individually sense, detect, and classify UAS vehicles 130 in the monitored space 105. The example UAS sensor node can also be configured to transmit an alert to the central server 115 or to another device, such as a smartphone or hand-held electronic device upon detecting a UAS vehicle 130. In one example, each UAS sensor node 110a-n can include a self-contained apparatus that may be positioned at any location for a particular monitored space 105, including within a residence, within a building, or outside. Each UAS sensor node 110a-n may also include an exterior casing that is constructed from metal, hard plastic, soft plastic and/or a combination thereof. This exterior casing may resist leakage to allow for extended positioning of the UAS sensor node 110 in an outdoor environment.

In certain example embodiments, each UAS sensor node 110a-n can be assigned a unique identifier (e.g., a media access control ("MAC") address) at the time of manufacture to enable a server or other electronic device to determine which UAS sensor node 110a-n has detected and identified a UAS vehicle 130. Alternatively, a user may program or otherwise enter a unique name for each UAS sensor node 110a-n. Each UAS sensor node 110a-n may then include the unique name or MAC address with any communication to the central server 115 or another electronic device (e.g., smartphone, hand-held electronic device, etc.) in order to uniquely identify the UAS sensor node 110 that is transmitting the information.

In addition, each UAS sensor node 110a-n may include a GPS transmitter 250 (of FIG. 2) to determine and transmit the precise location of the UAS sensor node 110a-n within a particular environment 100 to the central server 115. This GPS data may be used by the central server 115 to determine the estimated (based on the location of the particular UAS sensor node) location of the UAS vehicle 130 or the precise location (based on triangulation of multiple detections of the UAS vehicle 130 from multiple UAS sensor nodes) of the UAS vehicle 130.

The UAS vehicle detection environment 100 can also include a central server 115 or computer. The central server 115 can be a standard server computer or a cloud-based server computer. The central server 115 may include or otherwise be associated with suitable hardware and/or software for transmitting and receiving data and/or computer-executable instructions over one or more communication links or networks. The central server 115 may also include any number of processors for processing data and executing computer-executable instructions, as well as other internal and peripheral components currently known in the art or which may be developed in the future. Further, the central server 115 may include or be in communication with any number of suitable memory devices operable to store data and/or computer-executable instructions. For example, the central server 115 can be communicably coupled to one or more databases or memory storage devices (not shown) to store UAS vehicle audio files and detection events received from the one or more UAS sensor nodes 110a-n. By executing computer-executable instructions, the central server forms a special-purpose computer or particular machine. As used herein, the term "computer-readable medium" describes any medium for storing computer-executable instructions.

The example central server 115 may be a computing device that includes any number of server computers, mainframe computers, networked computers, desktop computers, personal computers, mobile devices, smartphones, digital assistants, personal digital assistants, tablet devices, Internet appliances, application-specific integrated circuits, microcontrollers, minicomputers, and/or any other processor-based devices. Additionally, in certain example embodiments, the operations and/or control of the central server 115 may be distributed among several processing components. In addition to including one or more processors, the central server may further include one or more memory devices (or memory), one or more input/output ("I/O") interfaces, and one or more network interfaces. The memory devices may be any suitable memory devices, for example, caches, read-only memory devices, random access memory devices, magnetic storage devices, removable storage devices, etc. The memory devices may store data, executable instructions, and/or various program modules utilized by the central server 115 and/or the UAS sensor nodes 110a-n, for example, data files, an operating system ("OS"), and/or example UAS vehicle audio files.

The OS may be a suitable software module that controls the general operation of the central server 115. The OS may also facilitate the execution of other software modules by the one or more processors. The OS may be any operating system known in the art or which may be developed in the future including, but not limited to, Microsoft Windows®, Apple OSX™ Apple iOS™, Google Android™, Linux, Unix, or a mainframe operating system.

The one or more I/O interfaces may facilitate communication between the central server 115 and one or more input/output devices, for example, one or more user interface devices, such as a display 120, keypad, control panel, remote control, mouse, microphone, etc., that facilitate user interaction with the central server. In certain example embodiments, the display 120 may be situated locally with respect to the central server 115. In other example embodiments, the display 120 may be positioned remotely from all or a substantial portion of the central server 115. The display 120 can be any form of display known to those of ordinary skill in the art, including, but not limited to, a cathode ray tube (CRT) display, a plasma display, a light emitting diode (LED) display, an organic LED display (OLED), a touch-screen display, a heads-up display (HUD), a virtual reality display, or the like.

The central server 115 or computer can be communicably coupled to the one or more UAS sensor nodes 110a-n. In one example embodiment, the central server computer 115 is communicably coupled to each of the one or more UAS sensor nodes 110a-n via one or more communications networks 125. The network 125 may include one or more independent and/or shared private and/or public networks including the Internet or a publicly switched telephone network. In other example embodiments, the central server 115 may communicate with each of the UAS sensor nodes 110*a*-*n* via direct connections and/or communication links.

Figure 2:
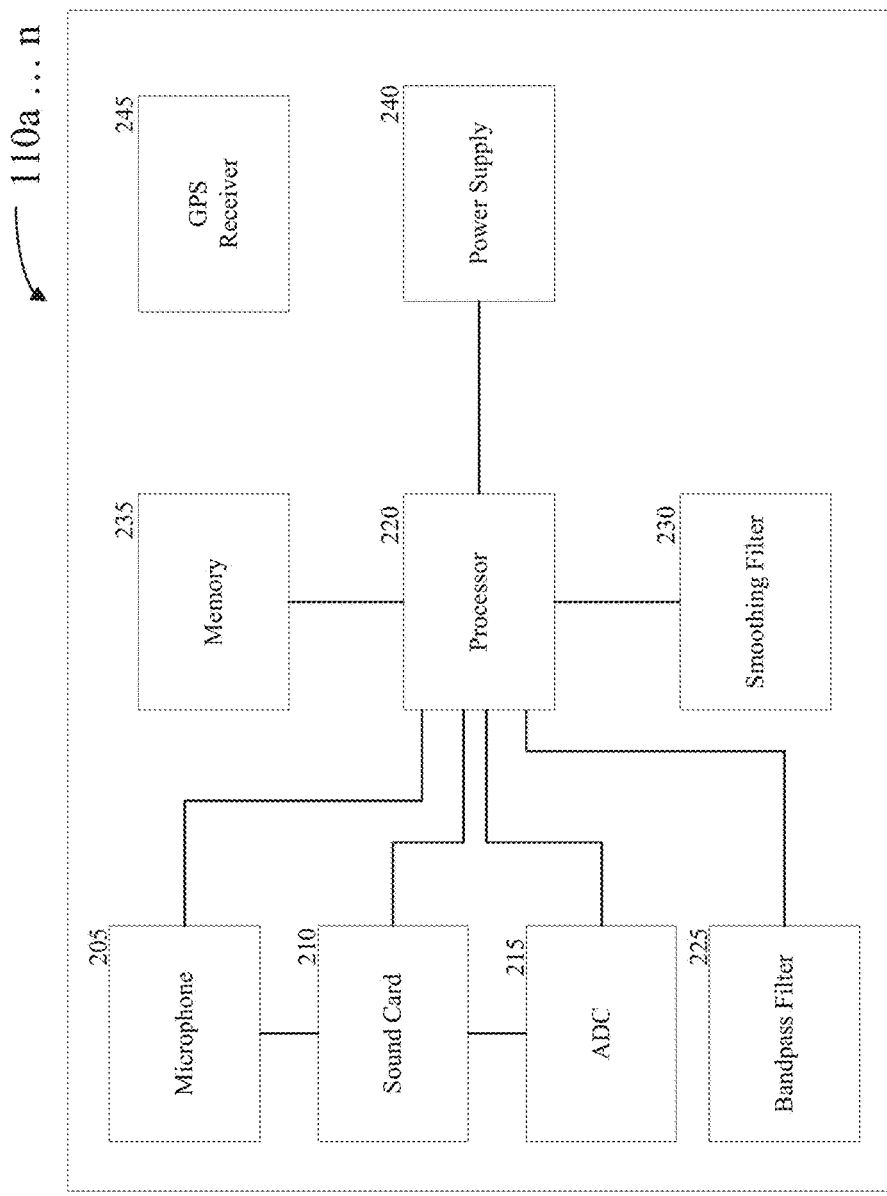
FIG. 2 is a simplified block diagram of a UAS sensor node of FIG. 1, in accordance with one example embodiment of the disclosure.

FIG. 2 is a simplified block diagram of a UAS sensor node 110*a*-*n* of FIG. 1, in accordance with one example embodiment of the disclosure. Referring now to FIGS. 1 and 2, the example UAS sensor node 110*a*-*n* can include a housing for the placement of components included in each node 110*a*-*n*. In addition, the UAS sensor node 110*a*-*n* can include one or more microphones 205. The microphones may be positioned within the housing, along an exterior of the housing, or provided adjacent to the housing and communicably coupled to other components within the housing. The example microphone 205 can be a directional or omnidirectional microphone.

The microphone 205 can be configured to have a sensitivity range within a frequency band associated with the sound generated by the motors of UAS vehicles 130. For example, the microphone 205 can be configured to detect ultrasonic frequency bands. In addition, the microphone 205 may also be configured to have an acoustic range to detect sounds from a UAS vehicle 130 anywhere in the range of substantially 1 foot to substantially 1 mile from the microphone 205 and more particularly within one-half mile of the microphone 205.

In certain example embodiments, each UAS sensor node 110*a*-*n* may include multiple microphones 205. For example, when two or more microphones 205 are provided, each microphone 205 may be provided along an exterior of the node housing but may face a different direction from the housing. This may allow for an increased arc from the housing at which UAS vehicles 130 may be detected.

Each UAS sensor node 110*a*-*n* can also include a sound card 210 communicably coupled to the one or more microphones 205 and a processor 220. For example embodiments where the UAS sensor node 110 includes multiple microphones 205, the sound card 210 may be communicably coupled to and service the multiple microphones or a sound card 210 may be provided for each microphone 205. The example sound card 210 is configured to record and digitize an audio signal sensed by the one or more microphones 205. The sound card 210 may be any type of sound card known to those of ordinary skill in the art.

The sound card 210 may be configured to digitize the sound sample into a 16-bit, 32-bit, 64-bit, or 128-bit digital signal. In operation, the sound card 210 can include an analog-to-digital converter 215 to convert the audio signal received from the one or more microphones to a digital audio signal. In addition, the sound card 210 may be configured to break up or divide the digital audio signal into multiple digital audio segments of a desired length. In one example, the length of each digital audio segment is substantially one second. However, in other example embodiments, the length of each digital audio segment can be any other time length including any length within the range of substantially 0.01 seconds to substantially one second, and any time length within the range of substantially one second to substantially one minute. The length of time for each sample may be a user-configurable parameter selected by the user. The sound card may be configured to transmit the converted and divided digital audio segments to the processor 220 for additional processing and evaluation.

Each UAS sensor node 110*a*-*n* can also include one or more processors 220. The one or more processors may be communicably coupled to one or more of the one or more microphones 205, sound card 210, analog-to-digital converter 215, bandpass filter 225, smoothing filter 230, and one or more memory or data storage devices 235. The one or more processors may also be operably coupled to a power supply 240 to provide electrical power for the one or more processors 240. The one or more processors 220 may be implemented as appropriate in hardware, software, firmware, or combinations thereof. Software or firmware implementations of the one or more processors 220 may include computer-executable or machine-executable instructions written in any suitable programming language to perform the various functions described herein. Hardware implementations of the one or more processors 220 may be configured to execute computer-executable or machine-executable instructions to perform the various functions described herein. The one or more processors 220 may include, without limitation, a central processing unit (CPU), a digital signal processor (DSP), a reduced instruction set computer (RISC), a complex instruction set computer (CISC), a System-on-a-Chip (SoC), a microprocessor, a microcontroller, a field programmable gate array (FPGA), or any combination thereof for handling specific data processing functions or tasks. Each UAS sensor node 110*a*-*n* may also include a chipset (not shown) for controlling communications between the one or more processors 220 and one or more of the other components of the UAS sensor node 110.

Each UAS sensor node 110*a*-*n* can also include a bandpass filter 225 communicably coupled to the processor 220. In one example, the bandpass filter is a part of the programming provided in the processor 220 and the operations of the bandpass filter are conducted by the processor 220. In one example embodiment, the bandpass filter 225 is a Butterworth bandpass filter or a maximally flat magnitude filter. The bandpass filter 225 can be configured to low-pass filter each digital signal segment processed by the sound card 210. In one example, the cutoff frequencies for the bandpass filter can be anywhere in the range of substantially 1 kilohertz (kHz) to substantially 90 kHz and more preferably anywhere in the range of substantially 1 kHz to substantially 75 kHz, and even more preferably substantially 5 kHz and substantially 65 kHz.

Each UAS sensor node 110*a*-*n* can also include a smoothing filter 230 communicably coupled to the processor 220. In one example, the smoothing filter is a part of the programming provided in the processor 220 and the operations of the smoothing filter are conducted by the processor 220. In one example embodiment, the smoothing filter 230 is configured to smooth out noise in each of the fast Fourier transformed digital signal samples generated by the processor 220. For example, the smoothing filter 230 can include a 25-point running mean filter that smooths out noise in the fast Fourier transformed digital signal samples. In other example embodiments, the smoothing filter 230 can employ anywhere in the range of a substantially 5-point to a substantially 50-point running mean filter and more preferably anywhere in the range of a 15-point to 35-point running mean filter.

Each UAS sensor node 110*a*-*n* can also include one or more memory or storage devices 235 communicably coupled to the processor 220. Each memory or storage device 235 can be any suitable memory devices, for example, caches, read-only memory devices, random access memory devices, magnetic storage devices, removable storage devices, etc. The memory or storage devices 235 can be configured to include instructions for completing the processes and methods described herein. Further, the memory or storage devices can include one or more tables, listings, or schedules of UAS vehicle audio sample files that are used for comparison to the received and processed audio signals to determine if the received audio signals are associated with a UAS device 130.

FIG. 3 is an example data structure 300 of audio files of UAS vehicle audio samples stored within the memory or data storage devices 235 of each UAS sensor node 110a-n of FIGS. 1 and 2, in accordance with one example embodiment of the disclosure. As shown in FIG. 3, the example data structure can include an audio file for each record stored in the data structure 300. Associated with each audio file can be one or more pieces of information specifying the UAS vehicle 130 that generated the sound included on the audio file. In one example embodiment, the one or more pieces of information can include the brand or manufacture of the UAS vehicle 130, the model of the UAS vehicle 130, a unique identifier for the UAS vehicle 130 (e.g., serial number, tail number, registration number), the owner of the UAS vehicle 130 (e.g., based on tail number), and motor strain level (e.g., low strain, medium strain, high strain). In addition, or in the alternative, other information can be associated with each audio file. For example, instead of, or in addition to, motor strain level, fields identifying the specific weight of payload for the UAS vehicle, or information specifying the payload (e.g., camera, missile, explosive, etc.) may be included.

The example data structure 300 may be a dynamic data structure 300 in that it is capable of being constantly updated. For example, as new UAS vehicles 130 are created, testing on the vehicles 130 can be conducted to determine new coefficients and intercept data based on the new audio samples. The new coefficients and intercepts data, which are applied to the filtered and smoothed audio files collected at a particular UAS sensor node 110a-d as part of the comparison process, can be stored in the data structure 300 via the central server 115 passing the coefficients and intercept data and associated information to each UAS sensor node 110a-n via the network 125. Further, as each UAS sensor node 110a-d collects audio signals that cannot be associated with a particular UAS vehicle audio sample in the data structure, the newly collected audio signal can either be transmitted by the particular UAS sensor node 110a-d to the central server 115 via the network 125 for further analysis and determination of coefficients and intercept data to be used in the comparison process and/or can be added to the data structure 300 as an audio file along with any other information known about the particular UAS vehicle 130. As such, each UAS sensor node 110a-n is a learning computer capable of detecting new UAS vehicle signals and storing them for future comparison. It should be appreciated that in other embodiments, the data structure 300 may include fewer or additional fields. Moreover, while the data structure 300 is shown as a flat file, in other example embodiments the data structure 300 may be hierarchal with a highest level corresponding to UAS vehicle brands, a second level corresponding to UAS vehicle models, and a lowest level corresponding to motor strain levels.

Each UAS sensor node 110a-n can also include one or more power supplies 240 electrically coupled to the processor 220. In addition, the power supply 240 may be directly or indirectly coupled to any one or more of the other components of the UAS sensor node. The power supply 240 can be any currently known or future developed power supply and can be configured to provide all of the power needs for the respective UAS sensor node 110a-n. In one example embodiment, the power supply 240 is a direct current (DC) power supply, such as a battery. In this example, the battery can be a rechargeable battery. Further, the UAS sensor node 110 can include a solar panel or array, a turbine or the like to recharge the power supply in order to increase the battery life. In other example embodiments, the power supply 240 is an alternating current (AC) power supply. While not shown, the node 110a-n can also include a combination of power supplies, include back-up power supplies to further increase battery life for each UAS sensor node 110a-n while positioned out in the field.

Figure 5:
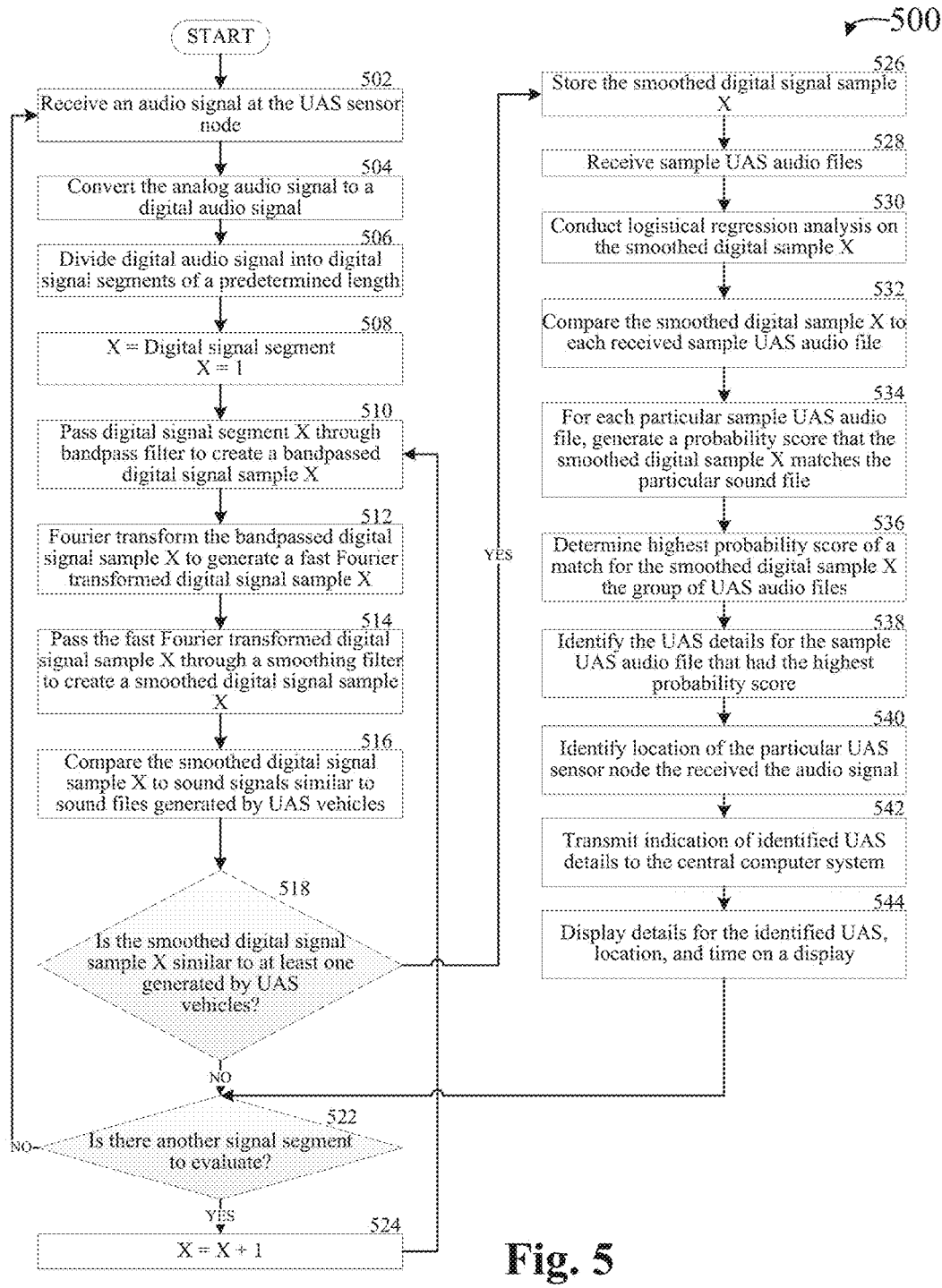
FIG. 5 is a flow chart illustrating an example method for detecting and identifying UAS vehicles in a monitored area, in accordance with one example embodiment of the disclosure.

FIG. 5 is a flow chart illustrating an example method 500 for detecting and identifying UAS vehicles 130 in a monitored area, such as the monitored area 105, in accordance with one example embodiment of the disclosure. Referring now to FIGS. 1-3 and 5, the example method 500 begins at the start block and proceeds to block 502, where an audio signal is received by at least one UAS sensor node 110a-n. In certain example embodiments, the audio signal can be received at more than one of the UAS sensor nodes (e.g., 110a, 110b, and 110c) and the signal strength, the GPS receiver 245 in each node 110a-c, and the positioning of each UAS sensor node 110a-c, as determined based on the GPS receiver data, can be used to triangulate the location of the source of the audio signal.

In one example, the received audio signal is an analog audio signal. The audio signal can be received by the one or more microphones 205 of the UAS sensor node 110. In one example embodiment, each microphone 205 is a USB microphone that is configured to receive and measure audible and ultrasonic sound using a micro electro-mechanical system (MEMS) technology sensing element that operates similar to a human ear drum. In one example embodiment, the frequency response for the receiving microphone 205 is within a range of substantially 2 kHz to substantially 95 kHz of sound. The source of the audio signal can be a UAS vehicle 130. However, the source of the audio signal could alternatively be an animal, a person, nature-based sounds (e.g., wind, rain, running water, rustling leaves, etc.), automobiles, other machines, and the like. One benefit of the disclosed method is an initial review is conducted to determine is the source of the audio signal is even likely to be from a UAS vehicle before conducting a more in depth secondary analysis of the audio signal.

At block 504, the received analog audio signal is converted to a digital audio signal. For example, the microphone 205 can pass the analog audio signal to the sound card 210, which can use an analog-to-digital converter 215 to convert the analog audio signal to a digital audio signal. In one example embodiment, the audio signal is sampled at a rate of 200 kHz with a 16-bit resolution. However, other sample rates between 30 kHz to 400 kHz and other resolutions, including, but not limited to, 8-bit, 32-bit, 64-bit, and 128-bit resolutions are also within the scope of this disclosure.

Figure 6:
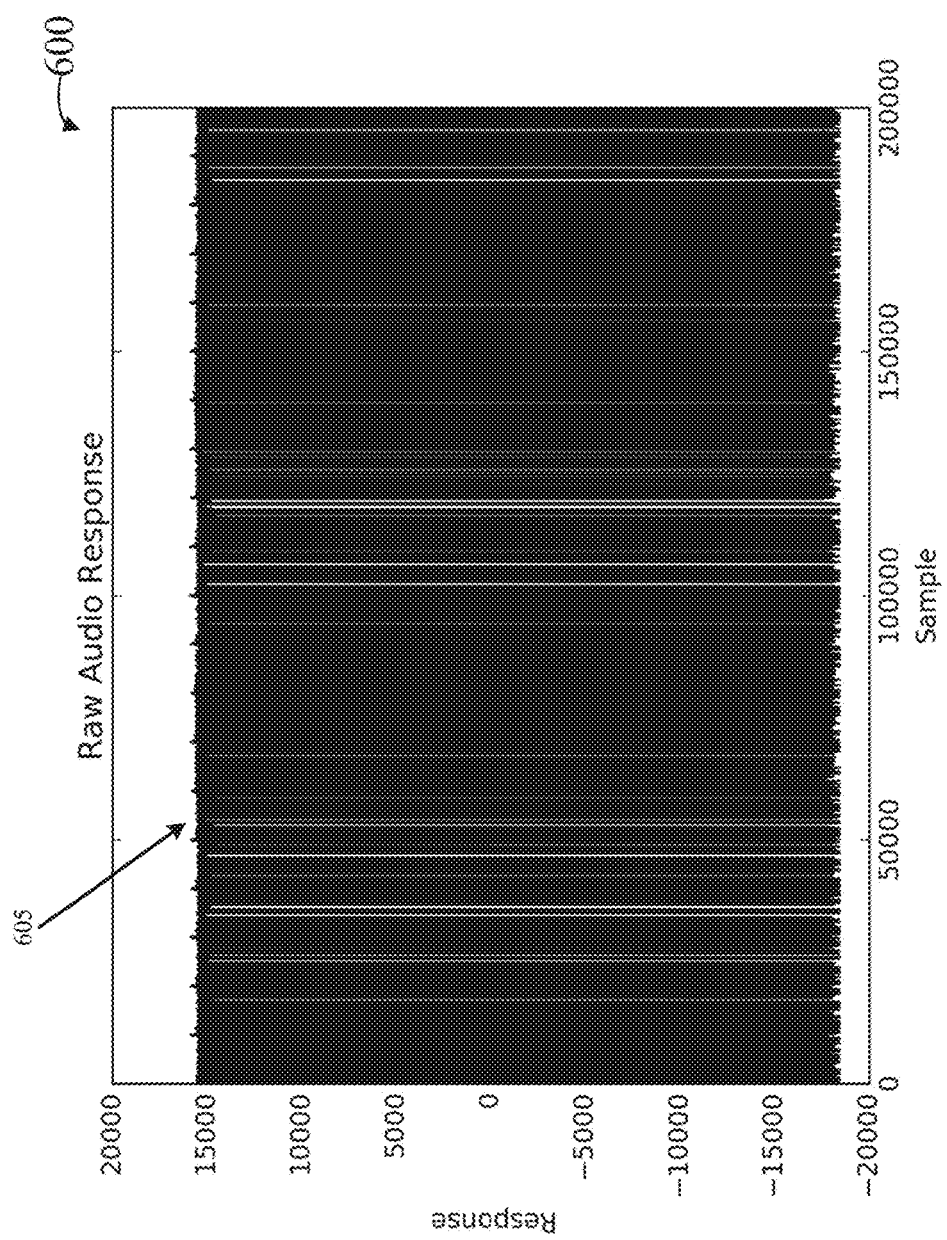
FIG. 6 is a graphical representation of a one-second digital signal segment sample, in accordance with one example embodiment of the disclosure.

At block 506, the sound card 210 or another portion of the UAS sensor node 110a-n separates or divides the digital audio signal into digital signal segments of a predetermined length. One example of a one-second digital signal segment is the digital signal segment 605 shown in the graph 600 of FIG. 6. In one example embodiment, the predetermined length of each digital signal segment 605 is 1 second or 1 Hz. Alternatively, other predetermine lengths for the digital signal segments 605, including those within the range of between substantially 0.01 seconds to substantially one minute, can be used. Separating the digital signal into smaller segments 605, as disclosed in block 506, is beneficial in the analysis of the audio signal because it reduces or eliminates Doppler effects on the audio signal by faster moving UAS vehicles 130. Further, by using the example predetermine length of one second, the system is able to generate an updated prediction of UAS vehicle activity in the monitored area 105 every second.

Figure 7:
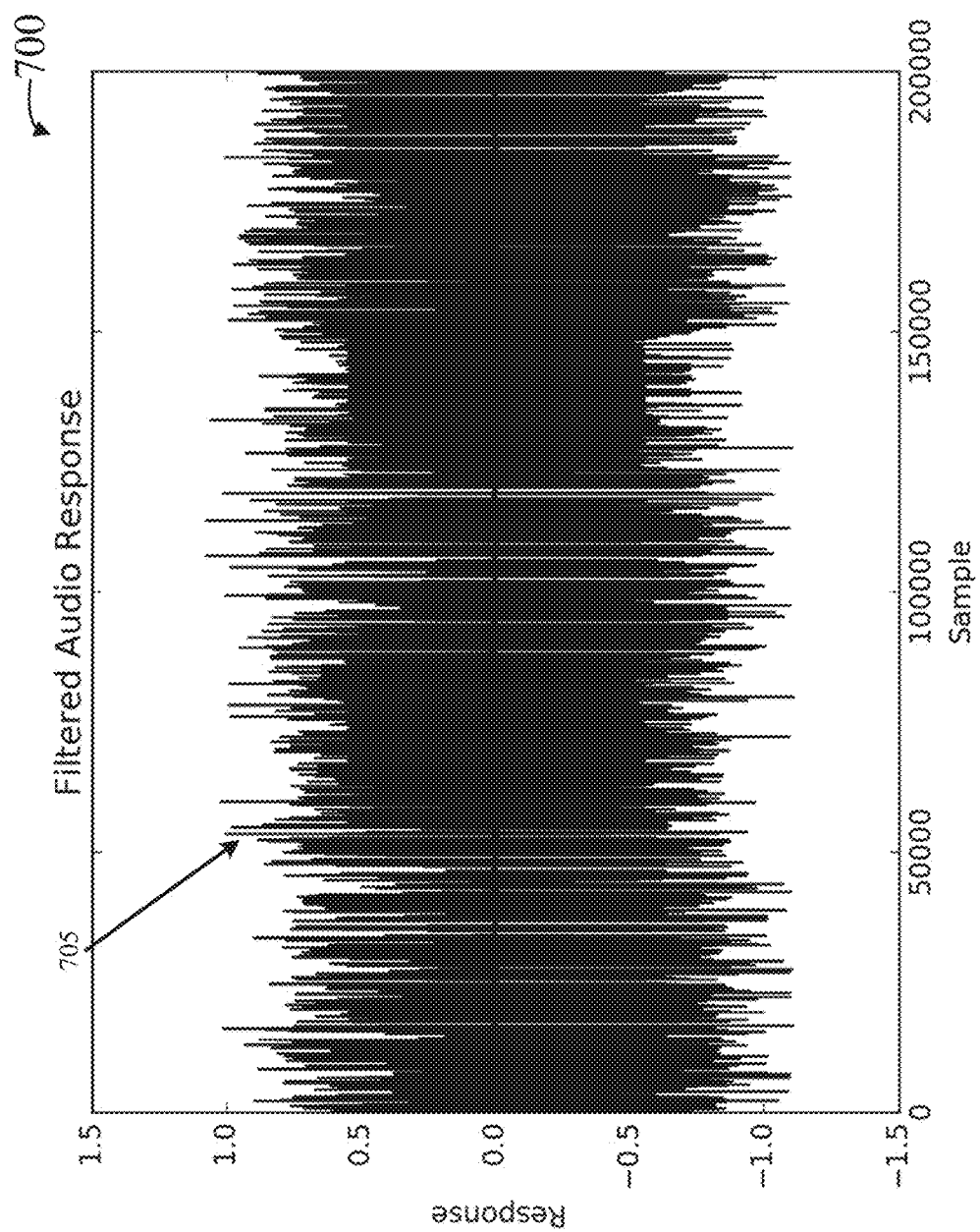
FIG. 7 is a graphical representation of a one-second long bandpassed digital sample, in accordance with one example embodiment of the disclosure.

At block 508, a counter variable X, representing each digital signal segment 605 created in block 506 from the digital audio signal, is set equal to one. At block 510, the first digital signal segment 605 is passed through a bandpass filter 225 at the UAS sensor node 110 to create a bandpassed digital sample X. For example, the processor 220 can pass the first digital signal segment 605 through the bandpass filter 225 or can conduct the bandpass filtering on the digital signal segment 605. One example of a one-second long bandpassed digital sample X is the bandpassed digital sample 705 shown in the graph 700 of FIG. 7. In one example embodiment, the bandpass filter is a Butterworth bandpass filter 225 with cutoff frequencies of substantially 5 kHz and substantially 65 kHz.

Figure 8:
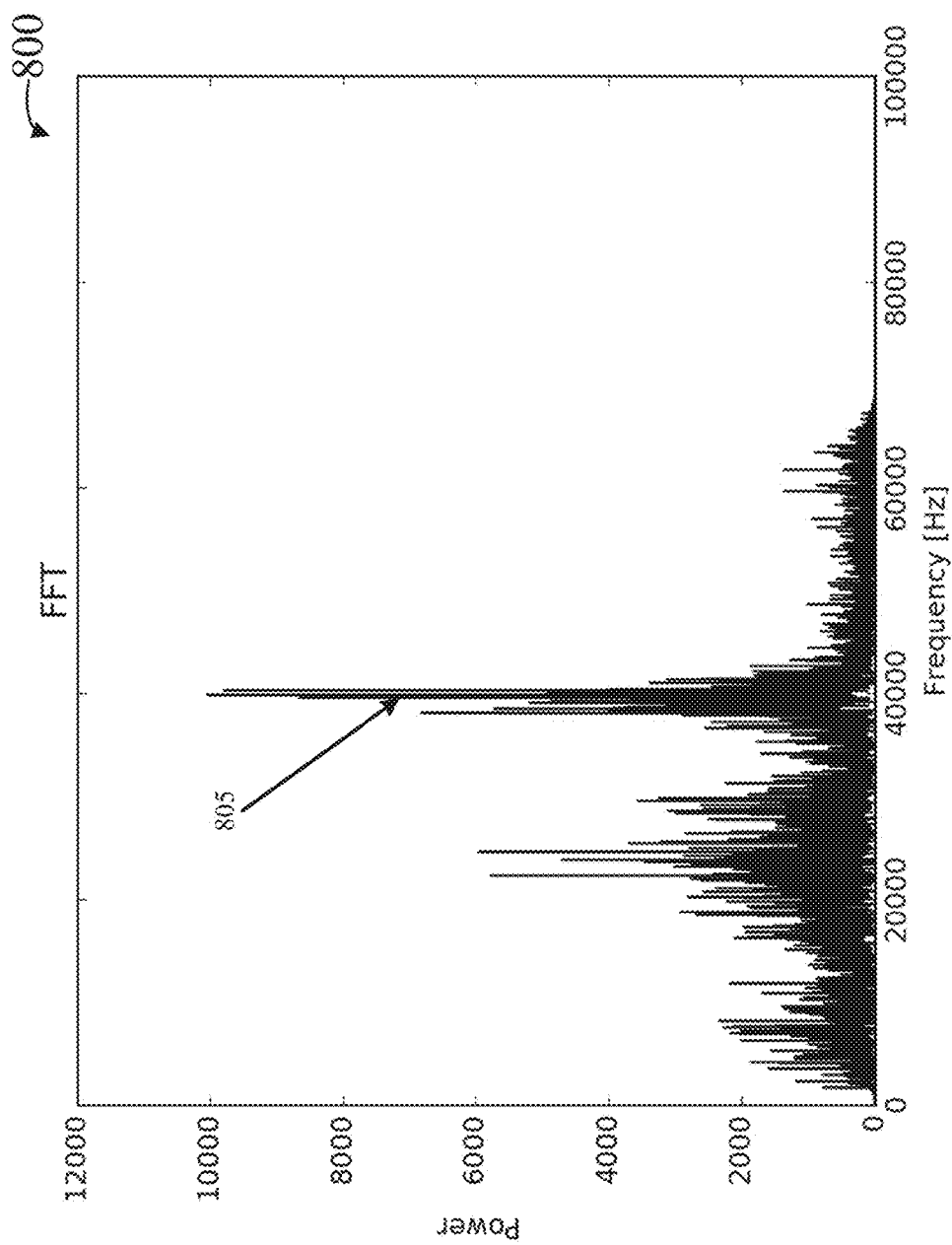
FIG. 8 is a graphical representation of a one-second long fast Fourier transformed digital signal sample, in accordance with one example embodiment of the disclosure.

At block 512, a fast Fourier transform is applied to the bandpassed digital sample X 705. In one example, the fast Fourier transform is conducted on the bandpassed digital signal sample 705 by the processor 220 or another portion of the particular UAS sensor node 110. The bandpassed digital sample X 705 can be Fourier transformed using a 1 Hz bin size, in one example embodiment. Alternatively, any other bin size could be used. The Fourier transform of the bandpassed digital sample X, breaks the waveform of the bandpassed digital sample X into an alternate representation characterized by sine and cosine. One example of a one-second long fast Fourier transformed digital signal sample X is the fast Fourier transformed digital signal sample 805 shown in the graph 800 of FIG. 8.

Figure 9:
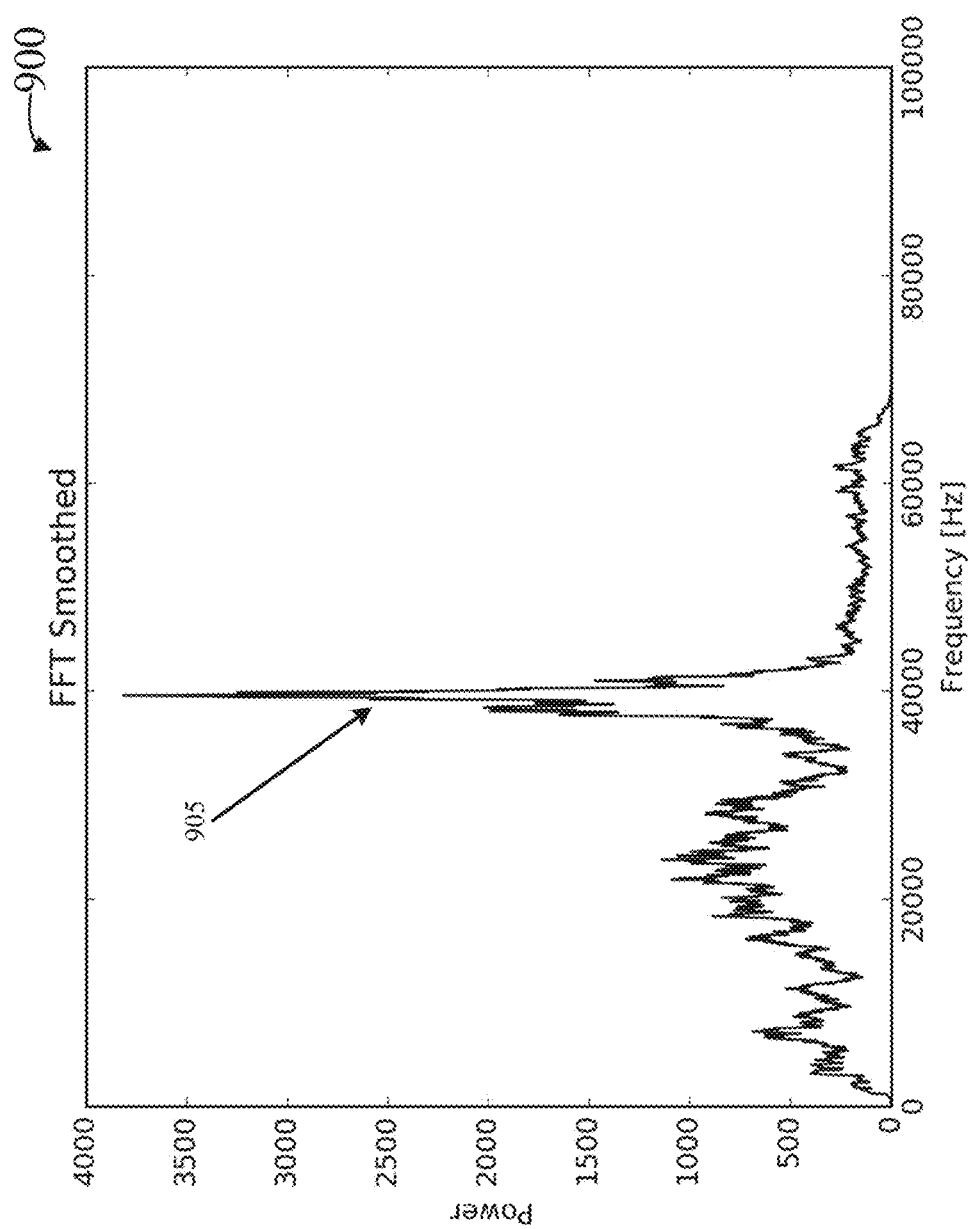
FIG. 9 is a graphical representation of a one-second long smoothed digital signal sample, in accordance with one example embodiment of the disclosure.

At block 514, the fast Fourier transformed digital signal sample X 805 is passed through a smoothing filter 230 to create a smoothed digital signal sample X. One example of a one-second long smoothed digital signal sample X is the smoothed digital signal sample 905 shown in the graph 900 of FIG. 9. For example, the processor 220 may pass the Fourier transformed digital signal sample X 805 to the smoothing filter 230 to smooth out the sample into a sample like that shown at 905 of FIG. 9. Alternatively, the processor 220 may conduct the smoothing process. In one example, the smoothing process includes passing the Fourier transformed digital signal sample X 805 though a multi-point running mean filter to smooth out the noise in sample X. In certain example embodiments, the multi-point running mean filter is a 25-point running mean filter. In another example, the multi-point running means filter can be anywhere within the range of a substantially 5-point to a substantially 50-point running mean filter and more preferably anywhere in the range of a substantially 15-point to a substantially 35-point running mean filter.

At block 516, the processor 220 compares the smoothed digital signal sample X 905 to sound signals similar to sound files generated by UAS vehicles 130. For example, the processor 220 can analyze the smoothed digital signal sample X 905 via a 1-class support vector machine algorithm with a linear kernel. The 1-class support vector machine algorithm is an unsupervised learning approach to define a binary function that evaluates to a nonzero value in the input-space region where most of the data lies. In this instance, the 1-class support vector machine algorithm is based off what is disclosed in Estimating the Support of a High-Dimensional Distribution, Bernhard Scholkopf et al., Microsoft Research, Microsoft Corporation, November 1999 (available via the Internet at http://www.cs.cmu.edu/~aarnold/ids/postal.pdf), the entire contents of which is incorporated herein by reference for all purposes.

In the example embodiment described herein, the input data (a training set of filtered, fast Fourier transformed, smoothed audio previously recorded with known UAS vehicles 130) are mapped to feature space using a linear kernel. Once in feature space, a hyperplane is established between the origin and the mapped input data such that the margin between the origin and these inputs is maximized. Establishing this hyperplane sets a boundary for the testing of new audio data, like that received in block 502 of FIG. 5.

When this model is applied to new processed audio data, such as the smoothed digital signal sample X 905, determining if a UAS vehicle 130 is present is a matter of calculating which side of the hyperplane the smoothed digital signal sample X 905 finds itself. If the evaluation of the smoothed digital signal sample X 905 reveals a positive value, then the audio sample received at block 502 is similar enough to the previously recorded drone audio such that we can classify that a drone is present. Conversely, a negative value shows the audio is too different from any drone we have seen and is therefore an outlier and likely not a drone. This approach has worked very well in out processing chain for weeding out audio data from the rest of the environment that is not a drone.

The support vector machine algorithm acts as an outlier rejection method for determining if the smoothed digital signal sample X 905 could not possibly be originating from a UAS vehicle 130. The objective in block 516 is to separate those samples that are potentially originating from a UAS vehicle 130 from everything else in the acoustic background.

At block 518, an inquiry is conducted to determine if the smoothed digital signal sample X is similar to an audio signal from a UAS vehicle 130. In one example, the inquiry is conducted by the process and the determination is made based on the comparison in block 516. If the smoothed digital signal sample X is not similar to an audio signal from a UAS vehicle, then the NO branch is followed to block 522. In block 522, an inquiry is conducted to determine if there is another digital signal segment to evaluate. For example, if the original audio signal received at the microphone 205 was ten seconds in length and the signal was divided up into one second increments, then there would be 10 digital signal segments to evaluate for the particular audio signal. In one example, the determination can be made by the processor 220 of the particular UAS sensor node 110. If there is not another digital signal segment to evaluate, the NO branch can be followed back to block 502 to receive the next audio signal at the microphone. On the other hand, if there is another digital signal segment to evaluate, the YES branch can be followed to block 524, where the counter variable X is incremented by one. The process then returns to block 510 to pass the next digital signal segment X through the bandpass filter.

Returning to the inquiry of block 518, if the smoothed digital signal sample X is similar to an audio signal generated by a UAS vehicle 130, the YES branch can be followed to block 526, where the processor 220 can store the smoothed digital signal sample X in memory 235. Alternatively, the processor 220 can transmit the smoothed digital signal sample X to the central server 115 which can store it in memory or a database associated with the central server 115. At block 528, sample UAS vehicle sound files are received and/or accessed. For example, the sound files can be provided by the central computer 115 to each UAS sensor node 110a-n prior to the start of the analysis and can be updated in real-time or near real-time. In one example, the sample UAS sound files can be stored in the memory 235 of each UAS sensor node 110a-n in a form substantially similar to that shown and described for the data structure 300 of FIG. 3.

At block 530, the processor 220 of the UAS sensor node 110a-n can conduct logistical regression analysis on the smoothed digital sample X 905. In one example embodiment, the processor 220 utilizes a one-versus-rest (OVR) logistic regression on the smoothed digital sample X 905 to determine the identity of a detected UAS vehicle 130. In this example, logistic regression seeks to treat class differentiation as a 0 or 1 binary problem, where 1 represents an "in-class" sample and 0 represents an "out-of-class" sample. Here, OVR logistic regression treats each model of UAS vehicle 130 as an individual class and seeks to differentiate it against all other classes. A separate OVR logistic regression model is trained for each UAS class. For example, if there are ten classes of UAS vehicle 130, ten separate logistic regression OVR models are actually trained. In the training framework, the logistic regression algorithm minimizes a logistic cost function to build an N-dimensional hyperplane mapping between class "0" and class "1", and a set of coefficients with an intercept is output that defines this hyperplane.

For example, once a new audio sample is gathered, such as in block 502, and processed, such as in blocks 504, 506, and 510-514, a decision function is calculated using the smoothed digital signal sample X 905 and the coefficients/intercepts from each of the OVR models stored in the UAS sensor node 110. The output of the decision function, a scalar value, represents the distance between an individual ("one") UAS vehicle class and the remaining UAS vehicle classes, where a greater distance represents more similarity to a particular UAS vehicle class. The identity of the UAS vehicle 130 is thus predicted as the UAS vehicle class that led to a maximum decision function value. So if you have ten classes represented in the audio data, you will get ten decision function values.

Class representations when training the logistic regression model can be as granular or as coarse as desired. A class could be a particular UAS represented by tail number, or as broad as all quadcopters or all fixed-wing vehicles, etc. At block 532, the processor 220 or another portion of the UAS sensor node 110a-n compares the smoothed digital sample X to each stored UAS sound file in the data structure 300 or in another location. For example, the decision function values are converted into probabilistic measures of similarity between one UAS vehicle class and the rest of the UAS vehicle classes. Each decision function value described above is input into a logistic function (standard mathematical logistic function). The output of this calculation is between 0 and 1. A high value, for example 0.9, would represent greater similarity to the individual UAS vehicle class ("one") than the "rest" of the UAS vehicle classes. This calculation is repeated for all decision function values and a summation is performed over all outputs.

At block 534, the processor 220 or another portion of the UAS sensor node 110a-n generates a probability score for each UAS sample audio file based on the probability that the smoothed digital sample X matches the particular UAS sample audio file. For example, the values of each individual UAS vehicle class can then be divided by the sum determined in the prior block to give the UAS vehicle class relative probabilities that one UAS vehicle 130 is present over the rest of the potential UAS vehicle classes.

At block 536, the processor 220 or another portion of the UAS sensor node 110a-n evaluates all of the probability scores generated at block 534 for each of the UAS sample audio files and determines the UAS sample audio file that has the highest probability score that the smoothed digital sample X matches the particular UAS sample audio files. For example, the greatest probability is always associated with the UAS vehicle class having the greatest decision function value. In certain examples, each of the probabilities can be compared by the processor 220 of the UAS sensor node 110 to a predetermined threshold value. If, based on the comparison, the processor 220 determines that none of the probabilities are greater than the predetermined threshold value, then confidence that the received audio signal in block 502 is from one particular UAS vehicle 130 versus one or more other UAS vehicles is low and the identity of the specific type and payload of the UAS vehicle 130, from which the audio signal was received at block 502, is set as indiscernible.

In one example, identifying the highest probability score can be accomplished by organizing the UAS sample audio files by probability score with regard to the particular smoothed digital sample X. Alternatively, one-on-one matching of probability scores for each UAS sample audio file may be conducted by the processor 220 or another portion of the UAS sensor node 110a-n to determine the highest score. While the example embodiment describes identifying the highest probability score of a match between the UAS sample audio files and the smoothed digital sample X, in another example embodiment, comparison and generation of probability scores could be based on identifying the UAS vehicle classes that are least likely to be a match, for which, the lowest probability scores would be identified.

At block 538, the processor 220 or another portion of the UAS sensor node 110a-n can identify the UAS vehicle details associated with the UAS sample audio file having the highest probability score. For example, the processor 220, based on the identification of the UAS sample audio file having the highest probability score in block 536, can access the matching record in the data file 300 containing the UAS sample audio files and determine the details of the particular UAS vehicle 130. At block 540, the processor 220 or another portion of the UAS sensor node 110a-n can determine either the location of the particular UAS sensor node 110a-n or the estimated location of the UAS vehicle 130 using the GPS receiver 245 for the one or more UAS sensor nodes 110 that detected the UAS vehicle. In certain example embodiments, data from only a single GPS receiver 245 is evaluated to determine an estimated location. In other example embodiments, GPS receiver data from multiple UAS sensor nodes that have detected the UAS vehicle 130 are evaluated and triangulation techniques are used to estimate the location, direction, and/or speed of the UAS vehicle 130.

At block 542, the processor 220 transmits the UAS vehicle details for the highest probability UAS sample audio file and location information to the central server 115. In addition, or in the alternative, the UAS vehicle details for the highest probability UAS sample audio file and the location information can be sent directly to a user's smartphone or other digital display device. At block 544, the identifying information for the UAS vehicle 130 associated with the UAS sample audio file having the highest probability score is displayed on the display device 120 or another display device of the user along with the location, speed, and/or direction information for the UAS vehicle 130. In one example embodiment, the system can generate a graphical user interface that includes a map or grid that includes the monitored area 105. The details of the UAS vehicle 130 can be generated on the map or grid at the location determined based on the one or more GPS receiver data. The process can then continue to block 522 to determine if there is another signal segment to evaluate.

Although unmanned aircraft detection systems methods, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Although example embodiments of the disclosure have been described, one of ordinary skill in the art will recognize that numerous other modifications and alternative embodiments are within the scope of the disclosure. Furthermore, while various example implementations and architectures have been described in accordance with example embodiments of the disclosure, one of ordinary skill in the art will appreciate that numerous other modifications to the example implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and steps of the flow diagrams, and combinations of blocks in the block diagrams and steps of the flow diagrams, respectively, may be implemented by execution of computer-executable program instructions. Likewise, some blocks of the block diagrams and steps of the flow diagrams may not necessarily need to be performed in the order presented, or may not necessarily need to be performed at all, according to some embodiments. Further, additional components and/or operations beyond those depicted in blocks of the block and/or steps of the flow diagrams may be present in certain embodiments.

Accordingly, blocks of the block diagrams and steps of the flow diagrams support combinations of means for performing the specified functions, combinations of elements or steps for performing the specified functions and program instruction means for performing the specified functions. It will also be understood that each block of the block diagrams and step of the flow diagrams, and combinations of blocks in the block diagrams and steps of the flow diagrams, may be implemented by special-purpose, hardware-based computer systems that perform the specified functions, elements or steps, or combinations of special-purpose hardware and computer instructions.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or steps specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or steps specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. Conditional language, such as, among others, "can," "could," "might," or "may," unless specifically stated otherwise, or otherwise understood within the context as used, is generally intended to convey that certain example embodiments could include, while other example embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. An apparatus comprising:
   at least one microphone;
   an analog-to-digital converter;
   at least one data storage device comprising a plurality of unmanned aircraft system (UAS) sample audio files; and
   at least one processor configured to:
      receive an analog audio signal detected by the at least one microphone from a monitored area;
      convert the analog audio signal to a digital audio signal by using the analog-to-digital converter;
      pass the digital audio signal through a bandpass filter to generate a bandpassed digital audio signal;
      conduct a Fourier transform on the bandpassed digital audio signal to generate a Fourier transformed digital signal sample;
      pass the Fourier transformed digital signal sample through a smoothing filter to generate a smoothed digital signal sample; and
      compare the smoothed digital signal sample to a plurality of sample UAS audio files for monitoring the smoothed digital signal sample.

2. The apparatus of claim 1 wherein the at least one processor is further configured to:
   calculate, for each of the plurality of sample UAS audio files, a plurality of probability scores, each one of the plurality of probability scores representing a likelihood that the smoothed digital signal sample matches a corresponding one of the plurality of sample UAS audio files;
determine one of the plurality of sample UAS audio files with a highest probability score;
identify, based on the determined highest probability score, a matching sample UAS audio file from the plurality of sample UAS audio files;
determine, based on the identified matching sample UAS audio file, one or more attributes of a UAS vehicle; and
transmit the one or more attributes of the UAS vehicle to a remote computing device configured to display the one or more attributes.

3. The apparatus of claim 1, wherein the microphone is a directional microphone.

4. The apparatus of claim 1, wherein the microphone is an omnidirectional microphone.

5. The apparatus of claim 1 further comprising:
a Butterworth bandpass filter communicably coupled to the processor; and
a smoothing filter communicably coupled to the processor.

6. The apparatus of claim 1, further comprising a power supply electrically coupled to the processor.

7. A computer-implemented method for detecting and identifying unmanned aircraft systems (UAS) comprising:
receiving, by a UAS sensor node comprising at least one microphone, an analog audio signal from a monitored area;
converting, by the UAS sensor node, the analog audio signal to a digital audio signal;
passing, by the UAS sensor node, the digital audio signal through a bandpass filter to generate a bandpassed digital audio signal;
conducting, by the UAS sensor node, a Fourier transform on the bandpassed digital audio signal to generate a Fourier transformed digital signal sample;
passing, by the UAS sensor node, the Fourier transformed digital signal sample through a smoothing filter to generate a smoothed digital signal sample; and
comparing, by the UAS sensor node, the smoothed digital signal sample to a plurality of sample UAS audio files for monitoring the smoothed digital signal sample.

8. The computer-implemented method of claim 7, further comprising:
calculating, by the UAS sensor node and for each of the plurality of sample UAS audio files, a plurality of probability scores, each one of the plurality of probability scores representing a likelihood that the smoothed digital signal sample matches a corresponding one of the plurality of sample UAS audio files;
determining, by the UAS sensor node, one of the plurality of sample UAS audio files with a highest probability score;
identifying, by the UAS sensor node and based on the determined highest probability score, a matching sample UAS audio file from the plurality of sample UAS audio files;
determining, by the UAS sensor node and based on the identified matching sample UAS audio file, one or more attributes of a UAS vehicle; and
transmitting, by the UAS sensor node, the one or more attributes of the UAS vehicle to a remote computing device configured to display the one or more attributes.

9. The computer-implemented method of claim 8, wherein the one or more attributes of the UAS vehicle comprise:

a UAS vehicle brand;
a UAS vehicle model; and
at least one of a UAS vehicle registration number, a UAS vehicle tail ID; a motor strain level for the UAS vehicle, a payload weight, and a payload type.

10. The computer-implemented method of claim 8, further comprising determining, by the UAS sensor node, a location of the UAS vehicle, wherein transmitting the one or more attributes of the UAS vehicle further comprises transmitting, by the UAS sensor node, the location of the UAS vehicle to the remote computing device.

11. The computer-implemented method of claim 10 further comprising:
generating, by the remote computing device, a graphical display of an area monitored by the at UAS sensor node; and
generating, by the remote computing device, a graphical depiction of the UAS vehicle on a portion of the graphical display based at least on the determined location of the UAS vehicle.

12. The computer-implemented method of claim 7, further comprising dividing, by the UAS sensor node, the digital audio signal into a plurality of segments, each of the plurality of segments having a predetermined temporal length.

13. The computer-implemented method of claim 12, wherein the predetermined length is one second.

14. The computer-implemented method of claim 7, wherein the bandpass filter is a Butterworth bandpass filter.

15. A non-transitory computer-readable medium comprising computer-executable instructions that, when executed by one or more processors, configure the one or more processors to perform operations comprising:
receive an analog audio signal from a monitored area;
convert the analog audio signal to a digital audio signal;
pass the digital audio signal through a bandpass filter to generate a bandpassed digital audio signal;
conduct a Fourier transform on the bandpassed digital audio signal to generate a Fourier transformed digital signal sample;
pass the Fourier transformed digital signal sample through a smoothing filter to generate a smoothed digital signal sample; and
compare the smoothed digital signal sample to a plurality of sample UAS audio files for monitoring the smoothed digital signal sample.

16. The non-transitory computer-readable medium of claim 15, wherein the operations further comprise:
calculate, for each of the plurality of sample UAS audio files, a plurality of probability scores, each one of the plurality of probability scores representing a likelihood that the smoothed digital signal sample matches a corresponding one of the plurality of sample UAS audio files;
determine one of the plurality of sample UAS audio files with a highest probability score;
identify, based on the determined highest probability score, a matching sample UAS audio file from the plurality of sample UAS audio files;
determine, based on the identified matching sample UAS audio file, one or more attributes of a UAS vehicle; and
transmit the one or more attributes of the UAS vehicle to a remote computing device configured to display the one or more attributes.

17. The non-transitory computer-readable medium of claim 16, wherein the operations further comprise:

determine a location of the UAS vehicle, wherein transmitting the one or more attributes of the UAS vehicle further comprises transmitting, by the UAS sensor node, the location of the UAS vehicle to the remote computing device.

18. The non-transitory computer-readable medium of claim 17, wherein the operations further comprise:
generate a graphical display of an area monitored by the at UAS sensor node; and
generate a graphical depiction of the UAS vehicle on a portion of the graphical display based at least on the determined location of the UAS vehicle.

19. The non-transitory computer-readable medium of claim 17, wherein the operations further comprise:
divide the digital audio signal into a plurality of segments, each of the plurality of segments having a predetermined temporal length.

20. The non-transitory computer-readable medium of claim 15, wherein the bandpass filter is a Butterworth bandpass filter.

* * * * *